（12） United States Patent
Wainwright

(10) Patent No.: US 6,413,341 B1
(45) Date of Patent: Jul. 2, 2002

(54) HAND-HELD OPTICAL FIBER INSERTION APPARATUS

(75) Inventor: Harry Lee Wainwright, Bethlehem, PA (US)

(73) Assignee: Ani-Motion, Inc., Bethlehem, PA (US)

( * ) Notice: Subject to any disclaimer, the term of this patent is extended or adjusted under 35 U.S.C. 154(b) by 59 days.

(21) Appl. No.: 09/643,699

(22) Filed: Aug. 22, 2000

(51) Int. Cl.[7] .................................................. B32B 31/00
(52) U.S. Cl. ........................ 156/93; 156/250; 156/293; 156/510; 156/579
(58) Field of Search ........................... 156/71, 93, 250, 156/293, 307.1, 510, 578, 579

(56) References Cited

U.S. PATENT DOCUMENTS 5,738,753 A * 4/1998 Schwar et al. ............ 156/379.5
5,881,206 A * 3/1999 Schwar et al. ............... 385/147
5,941,185 A * 8/1999 Selbach et al. ........... 112/80.16
6,151,439 A * 11/2000 Wainright .................... 385/147
6,296,734 B1 * 10/2001 Albertson et al. ........ 156/275.5

* cited by examiner

*Primary Examiner*—James Sells
(74) *Attorney, Agent, or Firm*—Sanford J. Piltch, Esq.

(57) ABSTRACT

A portable hand-held apparatus for inserting one or more optical fibers into one or more insertion points in a flexible or semi-rigid panel having a uniform planar surface, positioning and adhering the fibers at the insertion points, playing out a pre-selected length of fiber and cutting the fibers at the selected length for collection in groups or bundles for attachment to one or more illumination devices.

5 Claims, 4 Drawing Sheets

HAND-HELD OPTICAL FIBER INSERTION APPARATUS

BACKGROUND OF THE INVENTION

The present invention relates to a specialty hand-held optical fiber insertion apparatus that may be used to insert optical fibers into a flexible substrate, e.g., fabric, such as clothing, a hat, etc., or rigid or semi-rigid displays or signs. More specifically, the substrate is a semi-rigid base or planar surface for supporting the fiber optic display in the desired patterned array so that the ends of each optical fiber, arranged individually or in organized bundles, create the pre-determined and desired illuminated effect of the fiber optic display. The present invention allows the user, for the first time, to utilize a hand-held insertion apparatus to insert and arrange optical fiber ends individually for more intricate designs and displays of varying color lights, which require specialized attention to detail.

This type of technology has been virtually non-existent. U.S. Pat. No. 5,738,753 [Schwar et al.] teaches an automated machine for implanting optical fibers. The machine is comprised of a frame, for supporting a fiber inserter above a fiber insertion table, which pierces the interposed fabric (or semi-rigid, flexible) panel at a desired point of insertion and carries the optical fiber to the underside of the panel through an opening in the fiber insertion table for immersion into and removal from a liquid adhesive subsequently exposed to irradiation by ultra-violet light to cure and set the adhesive. This exposure to the ultra-violet light causes a change in state of the adhesive from the liquid to the solid state resulting in the permanent adherence of the optical fiber to the panel at the point of insertion. However, this machine fails to provide the kind of autonomy in design and hand-held convenience, i.e. freedom of motion, that the present invention provides.

In contradistinction, the present invention is a hand-held device, not a complex stationary machine with a pre-determined pattern for insertion of optical fibers, which allows the user greater freedom in design and attention to detail. Further, the present invention can insert the optical fiber from either side of the supportive panel or fabric and allows the user to secure the fiber to the substrate by hand-applying a quick cure adhesive, e.g., warmed air, specialized light, or heat cured adhesive. While the present invention may utilize ultraviolet light for further curation, it is not a necessary element, as is taught in the Schwar et al. patent. In fact, due to the nature of the present invention, air and heat adhesives are preferred over use of ultra-violet cured adhesives. Further, single or bundled optical fibers in an intricate or difficult design must be implanted by hand and to date, an apparatus has not been available to perform the required operation. Thus, the present invention overcomes this considerable setback by providing a novel and important contribution to the field.

Accordingly, it is an object of the present invention to provide a fiber inserting apparatus that is hand-held, portable, and allows the user the autonomy to create specialized patterns and illuminate more intricate designs with fiber optics than prior inventions have in the past. Further, it is also an object of the present invention to provide an apparatus for implanting a plurality of optical fibers manually and allowing the user to combine and sort the optical fibers into ordered bundles as desired.

It is another object of the present invention to allow the user to have ultimate autonomy in securing the optical fiber to the substrate once it has been inserted into the substrate and positioned appropriately. The user may then place the adhesive of choice on the outer surface of the optical fiber touching either the outer or inner surface of the substrate simultaneously and cure the adhesive such that the substrate and the optical fiber are securely adhered to each other.

Other objects will appear hereinafter.

SUMMARY OF THE INVENTION

The present invention provides a tangible solution to the considerable setbacks experienced with the prior inventions by providing an apparatus that allows the user to implant single or bundles of optical fibers by hand so that the user has greater autonomy in designing creative patterning for illuminated animations. Further, the fibers of the present invention may be secured in place by a hand applied quick-cure adhesive, thus allowing greater control over elaborate and complex designs. As a result, the user is capable of completing more intricate, free-hand designs than could be obtained from prior machines.

More specifically, the present invention is a hand-held apparatus for inserting one or more optical fibers into one or more insertion points in a flexible or semi-rigid panel having a uniform planar surface. The hand-held apparatus has an external housing for containing therewithin a drive means, a fiber feed means and a fiber severing means. The drive means includes an electrically operable and switchable motor drive coupled to the fiber feed means for operably controlling at least one or more segments of fiber feed rollers for feeding a length of optical fiber through one or more segments of a fiber guide means and into the fiber severing means. The fiber severing means is aligned with the fiber guide means to receive the length of optical fiber and pass the fiber through to a fiber insertion tool that is fixedly mounted to the front of the external housing and adjacent to the fiber severing means. The present invention further comprises a controller for selecting variable time periods in which said drive means is operably engaged to play out one or more pre-determined lengths of fiber corresponding to said time period.

The fiber insertion tool is aligned with the fiber severing means to receive the length of fiber and pass the fiber through a central hollow in the tool through a panel once the fiber insertion tool has pierced the panel at the desired point if insertion. Once the length of fiber has been positioned in the panel and a sufficient length of additional fiber for grouping and bundling has been played out from the fiber means, the fiber severing means is engaged. The fiber severing means is comprised of a severing blade attached to a severing handle, which when manually engaged, cooperate with each together to propel the blade into the fiber severing area to cut the fiber.

The present invention also proposes a preferred method for inserting one or more optical fibers into a flexible or semi-rigid panel having a uniform planar surface utilizing a hand-held portable optical fiber inserter comprising several steps. First, a length of optical fiber is fed into a fiber feed means of the optical inserter by moving through one or more segments of fibers guide means. The length of optical fiber is continuously fed through one or more segments of a second fiber guide means and into an aligned receiver of the fiber severing means and then into an aligned central hollow of the fiber insertion tool. The panel opposite the fiber insertion tool is then pierced with the fiber insertion tool at the desired point of insertion while carrying a length of the optical fiber through to the opposite side of the panel. A pre-determined length of fiber is played out that is sufficient for adhering the optical fiber to the panel and withdrawing the fiber insertion toll from the panel. Adhesive is applied between the optical fiber and the panel at one or more locations, which is cured causing a change in state of the adhesive permanently adhering to the optical fiber and the panel at the point of insertion. After the adhesive is cured, an additional length of optical fiber is played out such that the length is sufficient to gather the optical fiber with other optical fibers that may be sorted or grouped into one or more locations in a fiber sorting holder. The length of the optical fiber may further be played out in accordance with a variable control for selecting lengths of fiber to be played out from the portable inserter. Lastly, the length of the optical fiber is severed by engaging a fiber cutter in the fiber severing means for placing the cut end of the optical fiber in the fiber sorting holder.

BRIEF DESCRIPTION OF THE DRAWINGS

For the purpose of illustrating the invention, there is shown in the drawings forms that are presently preferred; it being understood, however, that the invention is not limited to the precise arrangements and instrumentalities shown.

Referring now to the drawings in detail, where like numerals refer to like parts or elements, there is shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
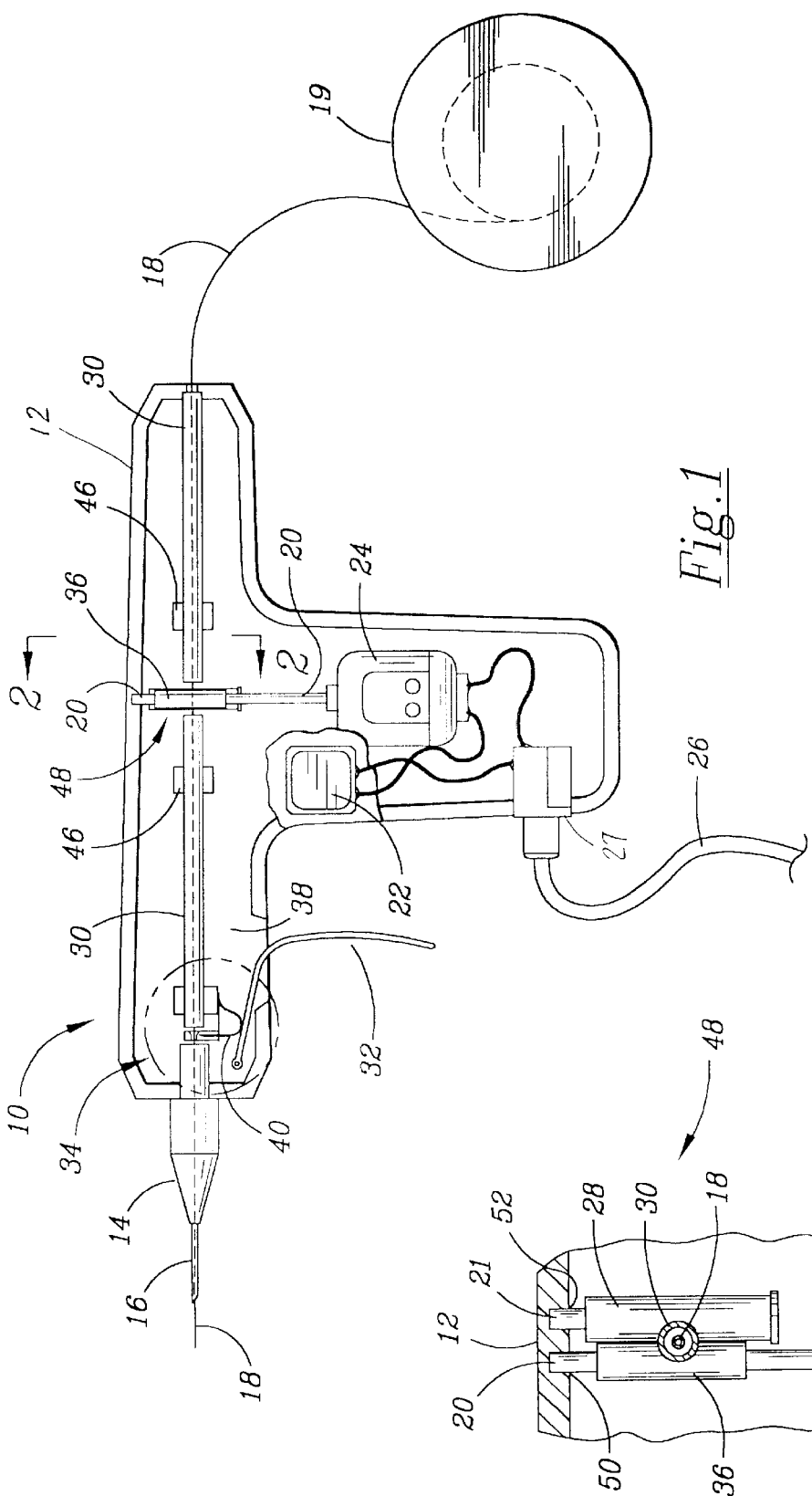
FIG. 1 is a side view of the optical fiber insertion apparatus of the present invention partially broken away to show the internal operating components.

Referring now to the drawings in detail, where like numerals refer to like parts or elements, there is shown in FIG. 1 the hand-held optical fiber insertion apparatus 10 of the present invention. Apparatus 10 is comprised of an exterior casing 12, which is attached to insertion tool head 14 that contains insertion tool 16 through which optical fiber 18 is fed. Certain control mechanisms, which will be described below, extend through the casing 12 such as power switch 22, power source cable connector 26 and fiber optic cutting or severing handle 32. Internally, apparatus 10 includes fiber feed drive motor 24, which is connected by spindle 20 to optical fiber feed section 48, severing section 34, and inner fiber feed tube 30, which is attached to exterior casing via tube alignment supports 46 located along the length of tube 30.

Figure 4:
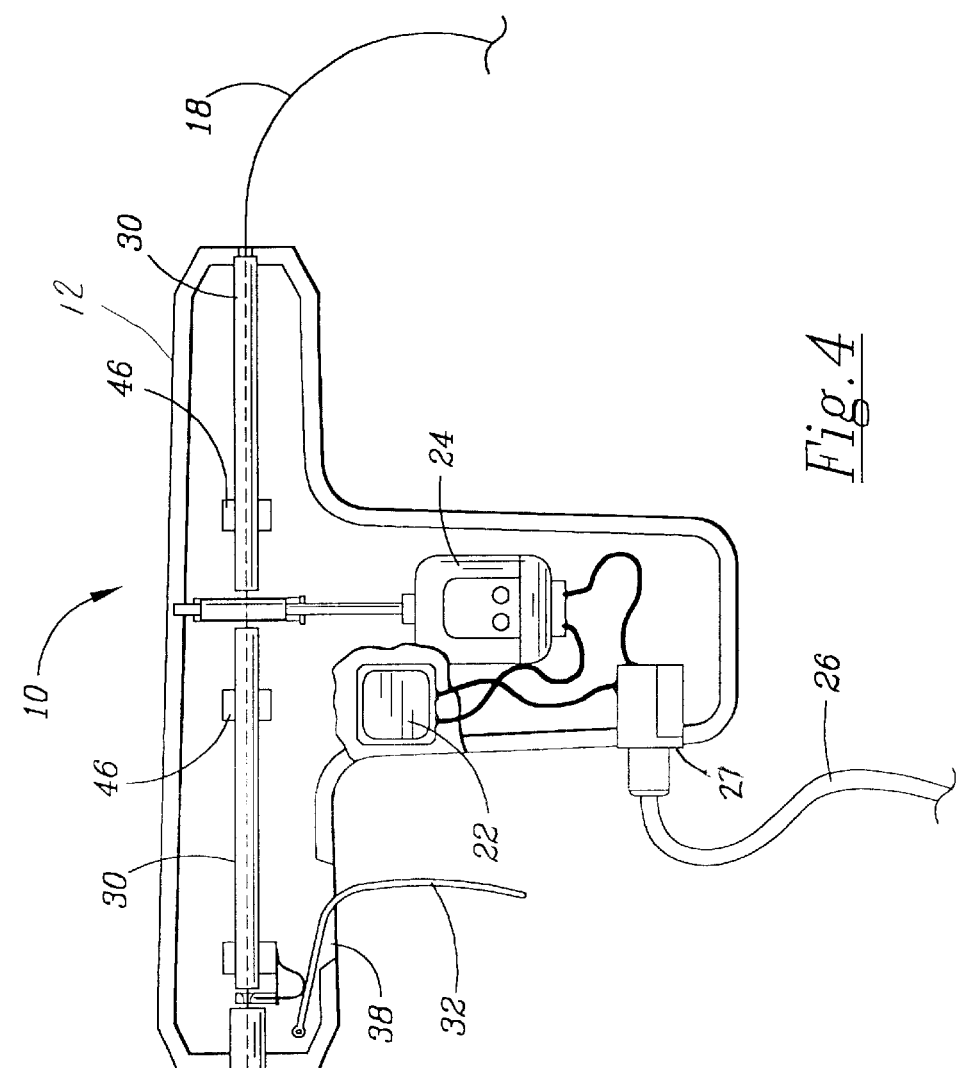
FIG. 4 is a side view of the optical fiber insertion apparatus of the present invention partially broken away to show the internal operating components additionally showing the insertion of the needle and optical fiber through a flexible substrate.

Insertion tool 16, which is attached to insertion head 14, is a needle-like rigid structure with a hollow central core, having a diameter large enough for fiber 18 to pass freely through and a sharpened end to penetrate flexible substrate 44. As shown in FIG. 4, the insertion tool 16 is capable of puncturing flexible substrate 44 at the desired point. After insertion tool 16 has punctured substrate 44 completely, optical fiber 18 is fed through apparatus 10 starting from the rear end of the apparatus 10 (from reel 19) through fiber feed tube 30. The diameter of tube 30 is slightly greater than that of fiber 18 so that fiber 18 may easily pass through and be directed forward by feed tube 30.

Figure 2:
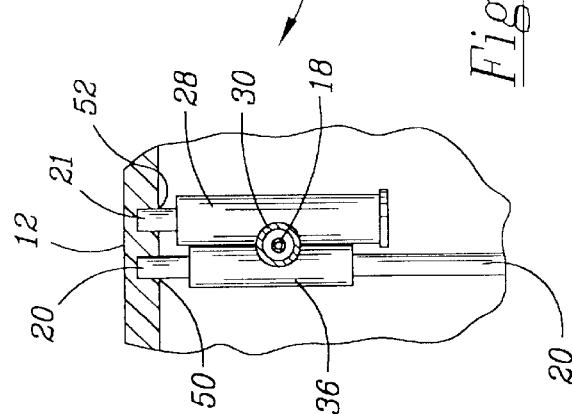
FIG. 2 is an enlarged view of the feeding mechanism of the present invention taken along Line 2—2 of FIG. 1.

To thread the insertion apparatus 10, fiber 18 is manually pushed through tube 30 until it reaches a break between the front and back sections of fiber feed tube 30 and is directed into the fiber feed section 48, as shown more specifically in FIG. 2. The fiber feed section 48 of the present invention contains the elements the control area for the controlled feeding of fiber 18 through the hand held apparatus 10 and to insertion tool 16. Spindle 20, with cylindrical spindle roller 36 fixedly mounted around its upper portion, is attached between motor 24 and exterior casing 12 and is movably secured within a mating cylindrical recess 50. Spindle 20 is responsive to actuation of the motor drive 24 initiated by power switch 22. Attached parallel to spindle 20, with spindle roller 36, is a second vertically oriented cylindrical roller 28, which is independent of motor 24. The roller 28 is rotationally mounted on a second spindle 21, which spindle is fixedly positioned in a parallel alignment with roller 36 (and spindle 20) in a second mating cylindrical recess 52 in the topmost portion of casing 12. Cylindrical roller 28 is free to move in either a clockwise or counter-clockwise direction depending upon the angular direction of spindle 20 and the direction of motion of motor drive 24. While it is contemplated that motor drive 24 will provide switchably controlled movement in a single direction depending upon the engaging of power switch 22, a reversing motor can be utilized with the appropriate switching controls.

Accordingly, as shown in FIG. 2, rollers 28 and 36 are just far enough apart so that an optical fiber 18 can pass though a small space between them, slightly compressing each roller 28, 36 resulting in frictional control over the longitudinal movement of the fiber 18 through the guide tube sections 30 and the insertion tool head 14. The material used for rollers 28 and 36 may be the same, e.g. plastic, or they may differ for example in texture, to potentially create a lesser or greater amount of friction so that rollers 36 and 28 may interface with fiber 18 to more accurately move fiber 18 through the narrow space between them and into the forward section of feed tube 30, and then into the insertion tool head 14.

Accordingly, when low-voltage motor drive 24, e.g. 9V, 12V, which is attached to a power source (not shown) through power cable 26 and connector 27, is activated by pressing the push-button power switch 22, spindle 20, with associated spindle roller 36, rotates in a clockwise direction (as shown). As spindle roller 36 rotates clockwise, it interfaces with the surface of parallel independent roller 28 and fiber 18, causing roller 28 to rotate counterclockwise and together, with roller 36, push optical fiber 18 through the fiber feed section 48 and continuously move fiber 18 forward into the next portion of feed tube 30 on the opposite side of rollers 28 and 36, as shown in FIGS. 1, 4 and 5.

Figure 5:
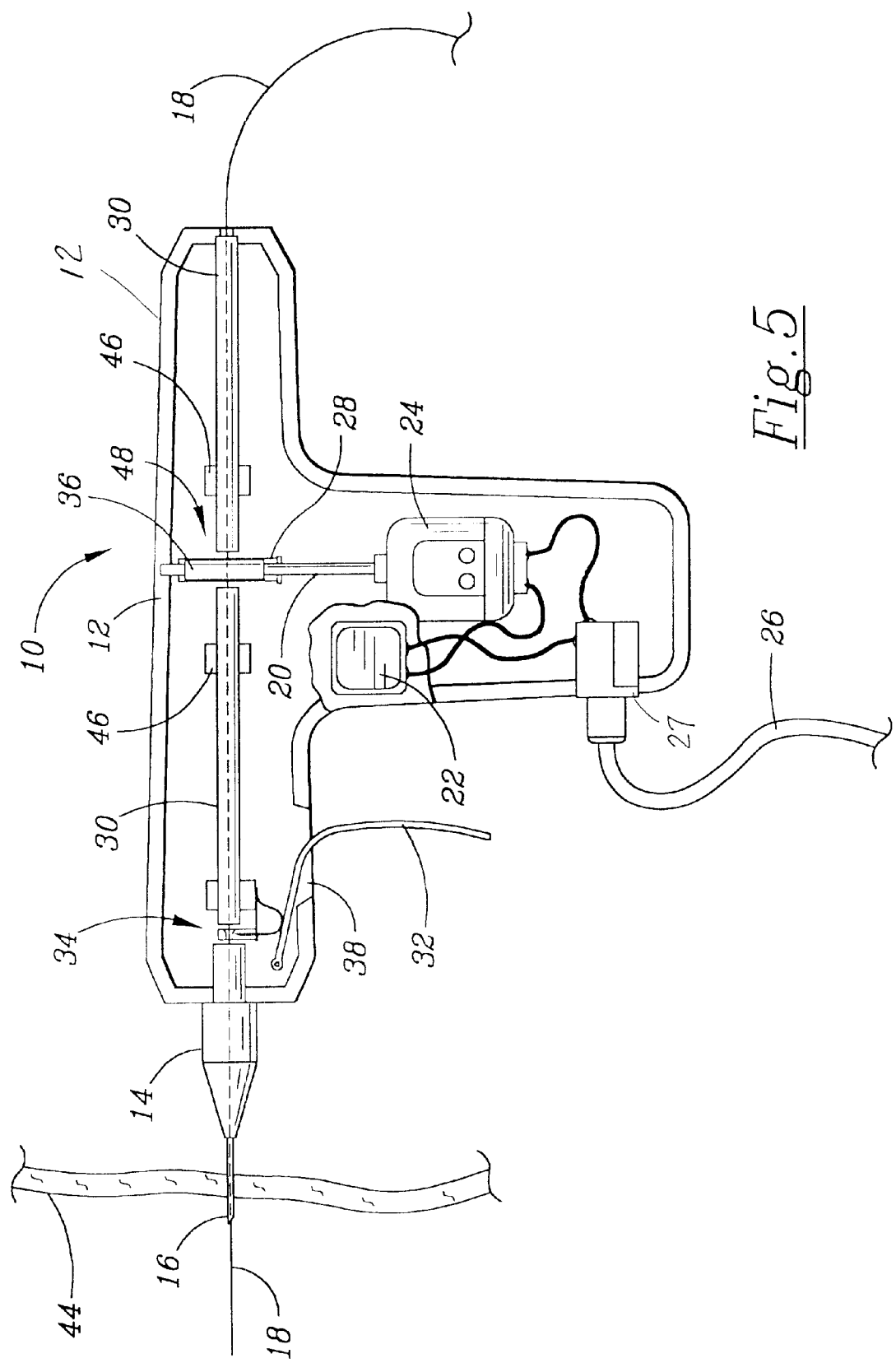
FIG. 5 is a side view of the optical fiber insertion apparatus of the present invention partially broken away to show the internal operating components additionally showing the insertion of the needle and optical fiber through a flexible substrate.

As the fiber proceeds through fiber feed section 48, it is directed through fiber feed tube 30, fiber severing section 34, insertion tool head 14 and eventually through the central hole of insertion tool 16 as shown by the dotted line in FIG. 5. Fiber 18 is fed through the insertion tool to a pre-determined distance, as shown specifically in FIG. 5. The fiber feed section 48 is then disengaged by releasing the push-button power switch 22 so that fiber 18 stops moving though apparatus 10. The user then pulls insertion tool 16 out of and away from substrate 44 a short distance away from the point of insertion on the other side of the flexible substrate 44.

The user then applies a liquid or semi-liquid adhesive around the area of optical fiber 18 and along the area of the substrate immediately adjacent to the fiber 18 by any suitable means that will circumferentially surround the optical fiber 18 and flow across the flexible substrate 44. The adhesive may be applied in a liquid or semi-solid state and then a curing mechanism may be applied (if necessary) and the adhesive allowed to solidify. The adhesive types, in addition to those which cure simply by being exposed to air, may be selected from a group of adhesives which may be described as two-part epoxies, silicones, acrylics, and other plastic adhesives which are manufactured by 3M Companies, Dow Corning, Loctite, and others, as well as hot-melt and contact adhesives, all of which are intended to be applied in a liquid or semi-solid state and cured at the site of adherence.

More specifically, heat cured-adhesives are especially useful because they preserve the original light transmissivity characteristics of optical fiber 18 under controlled conditions. For example, a heat gun or other such controlled device may be used to cure the adhesive to fiber 18 at the point of insertion to flexible substrate 44. The temperature of the heat desired to cure the adhesive without affecting the transmission characteristics of optical fiber 18, is preferred to be in the temperature range of 200° F.–350° F., with a temperature of approximately 275° F. being more desirable. If the temperature of optical fiber 18 exceeds approximately 160° F., the transmissivity characteristics of the optical fiber will be altered due to partial melting of the fiber so it is not desirable for direct contact of the heat source with the optical fiber.

After the adhesive has been properly cured, the user engages the push-button power switch so that additional fiber 18 may be fed through apparatus 10. Pre-determined lengths may be obtained as discussed more fully below. After the desired additional length of fiber 18 has been fed through apparatus 10, the user can sever the fiber 18 using a fiber severing apparatus 40. In order to sever fiber 18, the user simply grasps severing handle 32, which moves back and forth like a trigger within space 38. By pulling handle 32 back, fiber severing apparatus 40, with cutting blade 41, is engaged and is pushed upwards into fiber severing area 42 of severing section 34. The fiber severing area 42 is the space between the forward most end of fiber feed tube 30 and the rear-most portion of insertion tool head 14.

Figure 3:
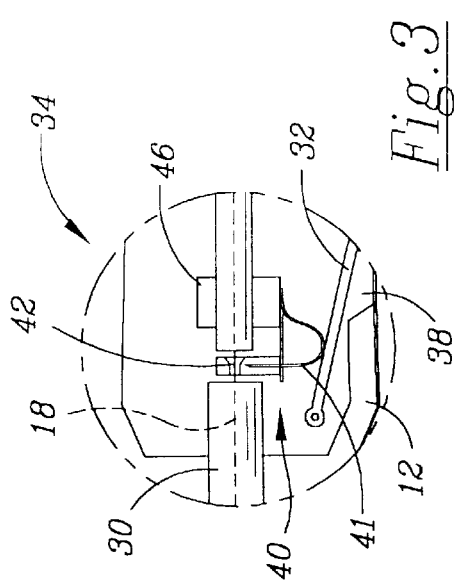
FIG. 3 is an enlarged sectional view of the optical fiber severing apparatus of FIG. 1.

Severing apparatus 40 has a cutting blade 41, which when engaged by use of handle 32, moves upward into severing area 42 and severs fiber 18, as may be best seen in FIG. 3. Opposite the feed tube 30 is an open conical recess which acts to guide the fiber 18 into and through the severing apparatus 40 so that the cutting blade 41 can sever the fiber 18 in a cylindrical space immediately forward of the conical guide, which cylindrical space approximates the outer diameter of the optical fiber 18.

To disengage severing apparatus 40, the user releases handle 32, allowing it to return to its original position, which permits the disengaging of the severing apparatus 40 by lowering the cutting blade 41 from the severing area 42 and returning the blade into its original disengaged position within the severing section 34, as shown in more detail in FIG. 3. The user then simply pulls the optical fiber 18 from the front of the insertion apparatus 10 and removes the apparatus 10 away from the substrate area to release the cut fiber from insertion tool 16. The user may then place the cut optical fiber 18 in a fiber sorting holder (not shown) for pre-sorted grouping or sequencing for later bundling of the optical fibers.

In summary, the manual process of inserting an optical fiber 18 into one or more points in a flexible substrate 44 can be described as follows with reference to FIGS. 5–8. The optical fiber 18 is manually fed into the rear of the insertion apparatus 10 until it impinges upon the fiber feed section 48, and more particularly the feed rollers 28, 36. The feed rollers 28, 36 are engaged by initiating the motor drive 24 by applying power through switch 22 so that the fiber 18 is operatively passed through the rollers 28, 36 and into the forward section of fiber guide 30. With the optical fiber 18 loaded into the insertion apparatus 10, the user may proceed to insert the optical fiber 18 at the desired point in the substrate 44.

Figure 6:
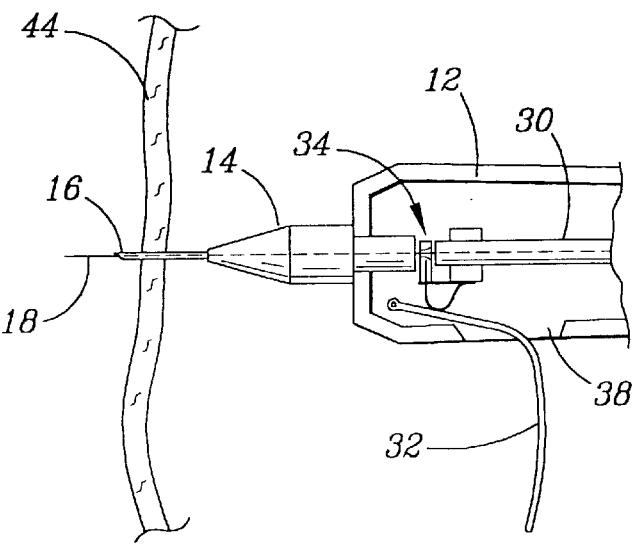
FIG. 6 is a sectional view of the apparatus of the present invention showing the needle inserted through a flexible substrate with the optical fiber played out past the end of the needle.

The insertion apparatus 10 is pushed through the substrate 44 at the desired point of insertion by passing the insertion tool 16 through the flexible substrate 44 a sufficient distance so that the insertion tool 16 extends outward from the substrate 44 on the reverse side as can be seen in FIGS. 5, 6. Then the fiber feed section 48 is again engaged to feed the optical fiber 18 through the forward fiber guide 30, passing through the fiber severing section 34, and into the insertion tool head 14 and out the front of the insertion tool 16. The fiber 18 is stopped by disengaging the fiber feed section 48 when the fiber 18 is extended outward a pre-determined distance from the needle or fiber insertion tool 16. This distance may be in the range of approximately one (1) inch to several inches and would be dependent upon the skill of the user, the degree of flexibility of the substrate 44 and the desired positioning of the adhesive.

Figure 7:
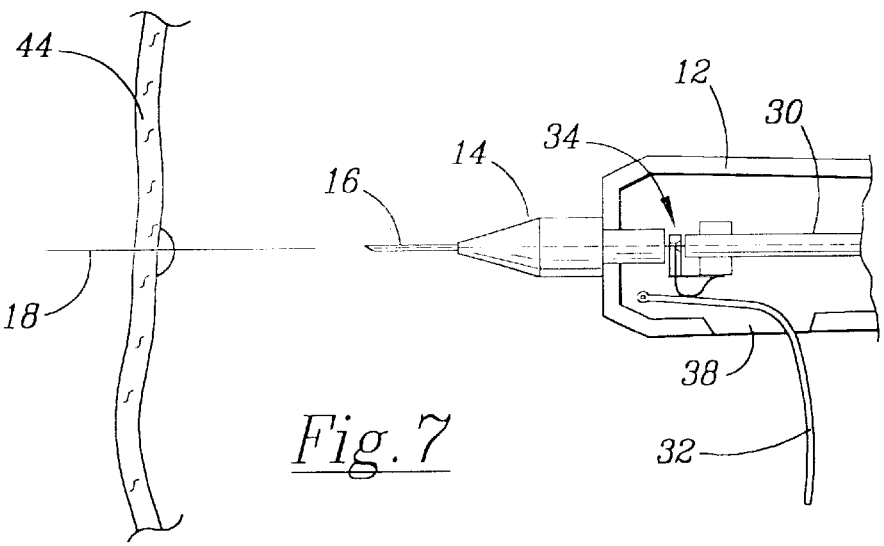
FIG. 7 is a sectional view of the apparatus of the present invention showing the severing apparatus engaged and the apparatus withdrawn away from the inserted optical fiber.

The insertion tool 16, and the entire insertion apparatus 10, is then withdrawn from the substrate 44 leaving only the optical fiber 18 extending through the substrate 44 as shown in FIG. 7. An adhesive 54, from the types described above, is placed at the desired location or locations, i.e. substrate front or back, or both, to secure the optical fiber 18 in place to the substrate 44 as depicted in FIG. 7. The adhesive 54 may be allowed to cure, or a means for curing applied so that the adhesive 54 takes on the shape of a bead as shown in FIG. 7. Then the fiber feed section 48 is re-engaged to feed an one or more additional lengths of fiber 18 outward from the insertion tool 16 so that the desired length of fiber 18, sufficient to be grouped and bundled, extends from the front of the insertion apparatus 10.

Figure 8:
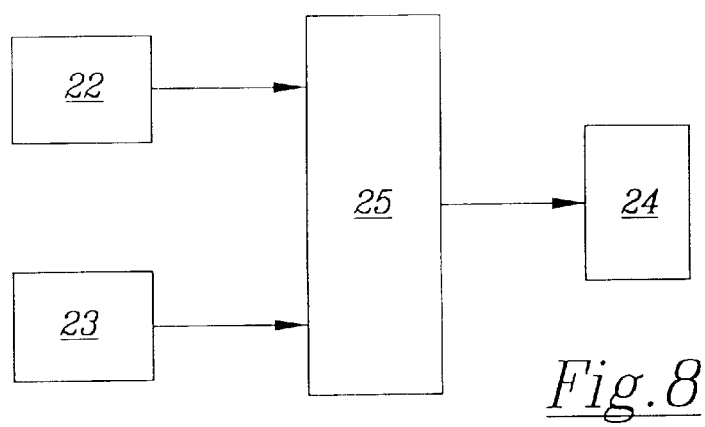
FIG. 8 is a block diagram sectional view of the feed control of the apparatus of the present invention.

At this point the fiber severing section 34 is engaged to sever the optical fiber 18 by using the severing handle 32 to engage the cutting blade 41 as shown in FIG. 8. The insertion apparatus 10 can then be pulled away from the fiber insertion area on the substrate 44 and the cut fiber can be placed in one or more groups for later bundling. The grouping may be nothing more than placing the cut fibers in a fiber sorting holder of any appropriate dimensions and design which can retain the fibers in their respective partial groupings until all insertions are completed and the bundling operation is undertaken.

To repeat the process for inserting another fiber 18, the user simply inserts the insertion tool 16 into flexible substrate 44 in another point and activates the motor drive 24 by pressing the power switch 22. Since the prior fiber 18 was cut at the fiber severing section 34, forward of the fiber feed section 48, the feed rollers 28, 36 simply feed the threaded optical fiber 18 through forward guide tube 30, severing section 34, and into insertion tool 16 so that the process may be repeated at the new point of insertion.

FIG. 8 depicts, in diagrammatic form, a controller for adjusting the fiber feed length which is passed through the fiber feed section 48 each time the feed drive motor 24 is engaged. Powering a multi-path delay circuit 25 is the drive motor switch 22 which has been described above. The other input to the multi-delay circuit 25 is the output of fiber feed length selector 23 which connection is represented by a single directional flow arrow which may provide either a continuous voltage level for a pre-selected period of time or a fiber length command represented by in digital form. In the event that the command is in digital form, the directional flow arrow is representative of either a serial or a parallel connection. Suitable electronics are contemplated to be utilized with either type of command signal for both the fiber feed length selector 23 and the multi-path delay circuit 25.

The multi-path delay circuit 25 will engage a circuit path between drive motor switch 22 and fiber feed drive motor 24 for the length of time in which fiber feed length selector 23 requires a circuit path connection. This may be accomplished utilizing a silicon rectifier or silicon transistor trigger which produces continuous circuit connections between the drive motor switch 22 and feed motor 24. Fiber feed length selector 23 may have a time period adjusting means in the form of a rotating switch which would engage different time delay circuits so that various and differing lengths of optical fiber 18 may be fed by feed motor 24 through fiber feed section 48. This is so a substantially exact length of fiber 18 is played out from the insertion apparatus 10 in order for the fiber length to be substantially similar (if not identical) for the grouping and bundling to be performed later.

The adjustment of the time delay/fiber length selector of the fiber feed length selector 23 can be done manually by the operator to correspond with lengths of optical fiber 18 for purposes of grouping and bundling. The fiber feed length selector 23 may either be housed in the insertion apparatus 10 or may be interposed with an additional connector between the drive motor switch 22 and feed motor 24 so that when the switch 22 is depressed the feed motor 24 is energized in accordance with the time corresponding to the length of fiber 18 to be fed through the insertion apparatus 10. In this manner the desired length of fiber 18 is played out from the insertion apparatus 10 so that each cut optical fiber has a substantially identical length for appropriate grouping and later bundling.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A method for inserting one or more optical fibers into a flexible or semi-rigid panel having a uniform planar surface utilizing a hand-held portable optical fiber inserter comprising the steps of:
   a. feeding a length of optical fiber into a fiber feed means of the optical fiber inserter through one or more segments of a fiber guide means;
   b. continuing feeding the length of optical fiber through one or more segments of a second fiber guide means and into an aligned receiver of a fiber severing means;
   c. continuing feeding the length of optical fiber through said fiber severing means and into an aligned central hollow of a fiber insertion tool;
   d. juxtaposing said panel opposite said fiber insertion tool and piercing said panel with said fiber insertion tool at the desired point of insertion carrying said length of optical fiber to the opposite side of the panel;
   e. playing out a pre-determined additional length of optical fiber sufficient for adhering the optical fiber to the panel and withdrawing said fiber insertion tool from the panel;
   f. applying an adhesive between the optical fiber and the panel at one or more locations and allowing said adhesive to be cured causing a change of state of said adhesive permanently adhering the optical fiber to the panel at the point of insertion;
   g. playing out an additional length of optical fiber sufficient to gather said optical fiber with other optical fibers and sorting or grouping said optical fibers in one or more locations in a fiber sorting holder; and
   h. severing the length of optical fiber by engaging a fiber cutter in the fiber severing means for placing the cut end of the optical fiber in the fiber sorting holder.

2. The method of claim 1 comprising the additional step of adjusting the length of optical fiber to be played out in accordance with a variable control for selecting lengths of fiber to be played out from said portable inserter.

3. A portable hand-held apparatus for inserting one or more optical fibers into one or more insertion points in a flexible or semi-rigid panel having a uniform planar surface, said apparatus having an external housing for containing therewithin a drive means, a fiber feed means, and a fiber severing means, said drive means including an electrically operable and switchable motor drive coupled to said fiber feed means for operably controlling at least one pair of fiber feed rollers for feeding a length of optical fiber through one or more segments of a fiber guide means and into said fiber severing means; said fiber severing means being aligned with the fiber guide means to receive the length of optical fiber and pass said fiber through to a fiber insertion tool fixedly mounted to the front of said external housing and adjacent to said fiber severing means; said fiber insertion tool being aligned with the fiber severing means to receive the length of fiber and pass said fiber through a central hollow in said tool through said panel once the fiber insertion tool has pierced the panel at a desired point of insertion; said fiber severing means being operable to sever the length of fiber once the fiber has been positioned in the panel and a sufficient length of additional fiber for grouping and bundling has been played out from the fiber feed means.

4. The apparatus of claim 1 wherein said fiber severing means contains a severing blade attached to a severing handle, which when manually engaged, cooperate with each other to propel the blade into the fiber severing area cutting the fiber.

5. The apparatus of claim 1 further comprising a controller for selecting variable time periods in which said drive means is operably engaged to play out one or more predetermined lengths of fiber corresponding to said time periods.

* * * * *